Patented Apr. 10, 1951 2,548,704

UNITED STATES PATENT OFFICE 2,548,704

SUBSTITUTED 2,3-DIHYDRO-2-METHYL-BENZOFURANS

Gerald H. Coleman, Freeland, and Raymond H. Rigterink, Midland, Mich., assignors to The Dow Chemical Company, Midland, Mich., a corporation of Delaware No Drawing. Application August 17, 1949, Serial No. 110,886

4 Claims. (Cl. 260—346)

This invention is concerned with substituted 2,3-dihydro-2-methylbenzofurans having the formula

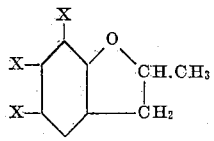

wherein one of the X symbols represents a phenyl or cyclohexyl radical and the other X symbols represent hydrogen. These new compounds are crystalline solids or oily liquids somewhat soluble in many organic solvents, substantially insoluble in water, stable to light and air and noncorrosive to the skin of man and higher animals. They are particularly valuable as intermediates in the preparation of more complex organic derivatives, as modifiers in plastic compositions, and as parasiticides.

Various methods may be employed in the preparation of these benzofuran compounds. A preferred procedure for producing the new compounds comprises heating an allyl biphenylyl or allyl cyclohexylphenyl ether with from 5 to 10 per cent of its weight of pyridine hydrochoride, as catalyst. The operative ethers to be employed are those represented by the following formula:

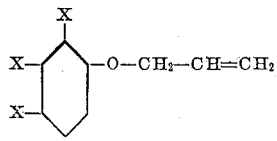

wherein one X symbol represents a phenyl or cyclohexyl radical and the other X symbols represent hydrogen. When an allyl 3-biphenylyl ether or allyl 3-cyclohexylphenyl ether is employed as a reactant, the principal product of the reaction is a 2,3-dihydro-2-methylbenzofuran substituted in the 6 position with a phenyl or cyclohexyl radical, respectively.

In carrying out the reaction, the catalyst and ether reactant are mixed together and heated at the boiling temperature of the reaction mixture and under reflux. Upon completion of the reaction, the crude mixture is fractionally distilled under reduced pressure, and the distillate successively washed with dilute aqueous hydrochloric acid and dilute aqueous sodium hydroxide, dried with anhydrous calcium chloride and redistilled under reduced pressure to obtain the substituted 2,3-dihydro-2-methylbenzofuran.

In an alternative method of preparation, the new compounds may be produced by heating, in the presence of pyridine hydrochloride as catalyst, a 2-allyl phenyl or 2-allyl cyclohexylphenol having the formula

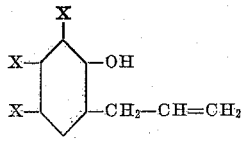

wherein one of the X symbols represents a phenyl or cyclohexyl radical and the other X symbols represent hydrogen. The conditions of reaction and methods of separation are essentially as described above.

The allyl biphenylyl or allyl cyclohexylphenyl ethers employed as starting materials may be readily prepared by reacting together substantially equimolecular proportions of sodium hydroxide, allyl chloride and a 2-, 3-, or 4-phenylphenol or cyclohexylphenol in an organic solvent such as ethanol. In such operations, the reactants are mixed together and the resulting dispersion heated with stirring at the boiling temperature of the reaction mixture and under reflux for from 2 to 6 hours. Following completion of the reaction, the solvent is removed by evaporation, and the residue washed with water, dried and fractionally distilled under reduced pressure to obtain the desired ether product.

The 2-allyl phenols which may be employed as starting materials may be prepared by heating an allyl biphenylyl ether or allyl cyclohexylphenyl ether for a period of time at the boiling temperature and under reflux. Upon completion of the reaction, the desired phenol is separated from the crude reaction mixture by conventional methods of purification, such as fractional distillation and fractional crystallization. When an allyl 3-biphenylyl or 3-cyclohexylphenyl ether is employed as a reactant in such preparations, the product of the reaction consists essentially of a 2-allyl-5-phenylphenol or 2-allyl-5-cyclohexylphenol, respectively.

In a representative operation, 117 grams (0.557 mole) of allyl 3-biphenylyl ether (having a boiling point of 166° to 176° C. at 6 millimeters' pressure, a density of 1.072 at 25° C., and a refractive index $n/D$ of 1.6058 at 25° C.) was dispersed in 250 milliliters of o-dichlorobenzene, and the resulting mixture heated for 8 hours at the boiling temperature and under reflux. The reaction mixture was then fractionally distilled at 5 millimeters' pressure to obtain a product boiling from 162° to 185° C. The latter product was diluted with 200 milliliters of 10 per cent sodium hydroxide and the resulting mixture washed with 100 milliliters of cyclohexane. The caustic solution was then acidified with concentrated hydrochloric acid, the mixture separating into aqueous and oil layers. The latter was separated and successively washed with cyclohexane and water, and fractionally distilled under reduced pressure to obtain 2-allyl-5-phenylphenol as a pale yellow oil boiling at 162° to 180° C. at 5 millimeters' pressure, and having a density of 1.095 at 24° C. and a refractive index $n/D$ of 1.6119 at 25° C.

The following examples illustrate the invention but are not to be construed as limiting.

*Example 1.—2,3 - dihydro-2-methyl - 5 - phenyl-benzofuran*

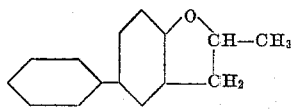

210 grams (1.0 mole) of 2-allyl-4-phenylphenol (boiling at 172°–184° C. at 4 millimeters' pressure and freezing at 102° C.) and 10.5 grams of pyridine hydrochloride were mixed together and heated with stirring at the boiling temperature of the reaction mixture and under reflux for 6 hours. The crude mixture was then distilled to obtain 132 grams of a white crystalline material boiling up to 190° C. at 3 millimeters' pressure. This material was dissolved in benzene, and the resulting solution successively washed with dilute aqueous hydrochloric acid, 10 per cent aqueous sodium hydroxide and water, and dried with anhydrous calcium chloride. This product was fractionally distilled under reduced pressure to obtain 2,3-dihydro-2-methyl-5-phenylbenzofuran as a white crystalline solid boiling at 155°–165° C. at 3 millimeters' pressure, freezing at 52.8° C. and having a carbon and hydrogen content at 85.91 per cent and 6.87 per cent, respectively. The theoretical carbon and hydrogen content of $C_{15}H_{14}O$ is 85.65 per cent and 6.72 per cent, respectively.

*Example 2.—2,3-dihydro-2-methyl-7-phenyl-benzofuran*

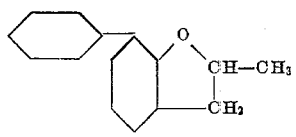

210 grams (1.0 mole) of allyl 2-biphenyl ether (boiling at 160°–168° C. and having a refractive index $n/D$ of 1.5966 at 25° C.) and 10.5 grams of pyridine hydrochloride were mixed together and heated with stirring at the boiling temperature of the reaction mixture and under reflux for 6 hours. The crude mixture was then distilled under reduced pressure to obtain 145.3 grams of a yellow colored distillate boiling up to 185° C. at 4 millimeters' pressure. The distillate was treated as described in Example 1 to obtain 2,3-dihydro-2-methyl-7-phenylbenzofuran. The latter was an oily liquid having a boiling point of 174°–182° C. at 10 millimeters' pressure, a refractive index $n/D$ of 1.6116 at 25° C., a specific gravity of 1.097 at 25°/4° C. and a carbon and hydrogen content of 85.23 per cent and 6.76 per cent respectively. The theoretical carbon and hydrogen content of $C_{15}H_{14}O$ is 85.65 per cent and 6.72 per cent, respectively.

*Example 3.—2,3-dihydro-2-methyl-5-cyclohexyl-benzofuran*

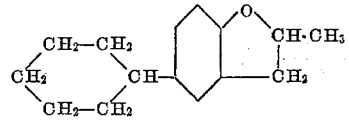

216 grams (1.0 mole) of allyl 4-cyclohexylphenyl ether (melting at 27° to 27.5° C.) and 10.8 grams of pyridine hydrochloride were mixed together and heated with stirring at the boiling temperature of the reaction mixture and under reflux for 20 hours. At the end of this period, an additional 10.8 grams of pyridine hydrochloride was added and heating continued for 5 more hours. The crude mixture was then distilled to obtain 143.6 grams of distillate boiling up to 196° C. at 12 millimeters' pressure. This distillate was dispersed in benzene and the dispersion successively washed with dilute aqueous hydrochloric acid, 5 per cent aqueous sodium hydroxide and water, and dried with anhydrous calcium chloride. This product was fractionally distilled under reduced pressure to obtain 5-cyclohexyl-2,3-dihydro-2-methylbenzofuran as an oily liquid having a boiling point of 167°–175° C. at 10 millimeters' pressure, a refractive index $n/D$ of 1.5373 at 25° C., a specific gravity of 1.019 at 25°/4° C. and a carbon content of 83.4 per cent. The theoretical carbon content of $C_{15}H_{20}O$ is 83.25 per cent.

*Example 4.—2,3-dihydro-2-methyl-7-cyclohexyl-benzofuran*

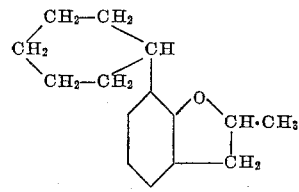

216 grams (1.0 mole) of allyl 2-cyclohexylphenyl ether (boiling at 137°–148° C. at 4 millimeters' pressure and having a refractive index $n/D$ of 1.5403 at 25° C.) and 10.8 grams of pyridine hydrochloride were mixed together and heated with stirring at the boiling temperature of the reaction mixture and under reflux for 8 hours. The crude mixture was then distilled under reduced pressure to obtain 152.9 grams of distillate boiling up to 160° C. at 3 millimeters' pressure. The distillate was then treated as described in Example 1 to obtain 7-cyclohexyl-2,3-dihydro-2-methylbenzofuran. The latter had a boiling point of 126°–136° C. at 3 millimeters' pressure, a specific gravity of 1.0261 at 25°/4° C., a refractive index $n/D$ of 1.5403 and a carbon and hydrogen content of 83.19 per cent and 9.4 per cent, respectively. The theoretical carbon and hydrogen content of $C_{15}H_{20}O$ are 83.25 per cent and 9.34 per cent, respectively.

*Example 5.—2,3-dihydro-2-methyl-6-phenyl-benzofuran*

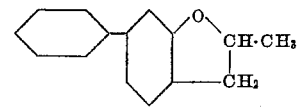

210.2 grams (1.0 mole) of allyl 3-biphenylyl ether and 10.5 grams of pyridine hydrochloride were mixed together and heated with stirring at the boiling temperature of the reaction mixture and under reflux for 8 hours. The crude mixture was then distilled under reduced pressure to obtain 127 grams of a water-white distillate boiling up to 170° C. at 5 millimeters' pressure. This distillate was dissolved in 200 milliliters of cyclohexane and the resulting mixture successively washed with 5 normal hydrochloric acid, 10 per cent sodium hydroxide, and water. This product was then fractionally distilled under reduced pressure to obtain 75 grams of 2,3-dihydro-2-methyl-6-phenylbenzofuran as a water-white liquid. The latter had a boiling point of 165° to 172° C. at 5 millimeters' pressure, a density of 1.095 at 27° C., a refractive index $n/D$ of 1.6085 at 25° C., and a carbon content of 85.36 per cent as compared to a theoretical carbon content of 85.67 per cent.

*Example 6.—2,3-dihydro-2-methyl-6-cyclohexylbenzofuran*

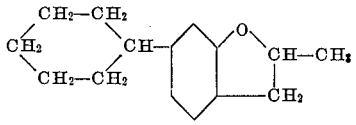

In a similar manner, 216 grams (1.0 mole) of allyl 3-cyclohexylphenyl ether and 10.5 grams of pyridine are mixed together and heated at the boiling temperature of the reaction mixture to produce 2,3-dihydro-2-methyl-6-cyclohexylbenzofuran.

To demonstrate the toxicity of these compounds, aqueous sprays were prepared containing 3 pounds of a substituted 2,3-dihydro-2-methylbenzofuran toxicant, and as a wetting and dispersing agent, ⅓ pound of the dioctyl ester of sodium sulfosuccinic acid (Aerosol OT) per 100 gallons of solution. When employed for the control of two-spotted spider mite on bean plants, the spray containing 2,3-dihydro-2-methyl-5-phenylbenzofuran gave a control of 95 per cent, and the sprays containing 2,3-dihydro-2-methyl-7-phenylbenzofuran, 2,3-dihydro-2-methyl-5-cyclohexylbenzofuran and 2,3-dihydro-2-methyl-7-cyclohexylbenzofuran each gave a control of 100 per cent.

We claim:

1. A substituted 2,3-dihydro-2-methylbenzofuran having the formula

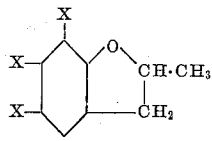

wherein one of the X symbols represents a member of the class consisting of the phenyl and cyclohexyl radicals, and the other X symbols represent hydrogen.

2. 2,3-dihydro-2-methyl-5-phenylbenzofuran.
3. 2,3-dihydro-2-methyl-7-phenylbenzofuran.
4. 2,3-dihydro-2-methyl-5-cyclohexylbenzofuran.

GERALD H. COLEMAN.
RAYMOND H. RIGTERINK.

REFERENCES CITED

The following references are of record in the file of this patent:

FOREIGN PATENTS

| Number | Country | Date |
|---|---|---|
| 279,864 | Germany | 1913 |

OTHER REFERENCES

Berichte de deut. Ges, vol. 58 (1925), pp. 275–281.
Chemical Abstracts, vol. 19, page 1566 (1925).
Beilstein, 4th ed., page 76, vol. 17 (1933).
Chemical Abstracts, vol. 34, p. $3271^3$ (1940).